US011687678B2

(12) United States Patent
Medwed et al.

(10) Patent No.: US 11,687,678 B2
(45) Date of Patent: Jun. 27, 2023

(54) DEVICE, INTEGRATED CIRCUIT AND METHODS FOR DETECTING, RESPONDING TO AND REMOVING A COMPROMISING ATTACK

(71) Applicant: NXP B.V., Eindhoven (NL)

(72) Inventors: Marcel Medwed, Steiermark (AT); Tobias Schneider, Styria (AT); Ventzislav Nikov, Haasrode (BE); Jorge Miguel Ventuzelos Pereira, Nice (FR); Rudi Verslegers, Genk (BE); Nikita Veshchikov, Brussels (BE); Joppe Willem Bos, Wijgmaal (BE); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 120 days.

(21) Appl. No.: 17/081,589

(22) Filed: Oct. 27, 2020

(65) Prior Publication Data

US 2021/0133362 A1 May 6, 2021

(30) Foreign Application Priority Data

Oct. 30, 2019 (EP) .................................... 19306412

(51) Int. Cl.
*G06F 21/74* (2013.01)
*G06F 21/60* (2013.01)

(52) U.S. Cl.
CPC ............ *G06F 21/74* (2013.01); *G06F 21/606* (2013.01)

(58) Field of Classification Search
CPC ........ G06G 21/74; G06F 21/606; G06F 21/74
(Continued)

(56) References Cited

U.S. PATENT DOCUMENTS 7,555,775 B2 6/2009 Smith
7,900,249 B2 3/2011 Burcham et al.
(Continued)

FOREIGN PATENT DOCUMENTS

EP 0999673 B1 6/2004
WO PCT-2013/188830 A1 12/2013
(Continued)

OTHER PUBLICATIONS

Xu et al., Dominance as a New Trusted Computing Primitive for the Internet of Things, Mar. 2019 (Year: 2019).*
(Continued)

*Primary Examiner* — Thanh T Le

(57) ABSTRACT

A device and methods are described that comprise at least one host application and a rich execution environment. At least one interface is operably coupled to the REE for communicating with a remote server. A security sub-system comprises a security monitoring and control circuit coupled to the REE and connectable to the remote server via the REE and the at least one interface. The security monitoring and control circuit comprises an analytics circuit configured to detect an anomaly following a compromisation of the device. The security monitoring and control circuit is arranged to treat the REE as an untrusted component and in response to a detection of a compromisation of the REE or a component in the device that is accessible by the REE by the analytics circuit, the security monitoring and control circuit is configured to re-establish a secure connection to the remote server that tunnels through the REE and at least partially removes the compromisation from the device.

15 Claims, 4 Drawing Sheets

200
210
215
Device
REE
Device
230
235
140
Remote Server
220
122
124
250
233
290
228
212
214
Security Sub.

(58) Field of Classification Search
USPC .............................................................. 726/2
See application file for complete search history.

(56) References Cited

U.S. PATENT DOCUMENTS

| | | | | |
|---|---|---|---|---|
| 8,359,646 | B2 * | 1/2013 | Suffern | H04L 63/1441 713/168 |
| 8,489,922 | B2 | 7/2013 | Matthew | |
| 8,839,435 | B1 * | 9/2014 | King | H04L 63/1425 726/22 |
| 8,869,138 | B2 | 10/2014 | Bandakka et al. | |
| 8,892,928 | B2 | 11/2014 | Maciocco et al. | |
| 8,909,930 | B2 | 12/2014 | Winslow et al. | |
| 9,300,642 | B2 | 3/2016 | Weis et al. | |
| 9,722,904 | B2 | 8/2017 | Liu et al. | |
| 2003/0084337 | A1 * | 5/2003 | Simionescu | H04L 41/0803 713/190 |
| 2004/0255167 | A1 * | 12/2004 | Knight | H04L 41/28 709/224 |
| 2010/0180130 | A1 * | 7/2010 | Stahl | H04W 12/108 713/193 |
| 2010/0191950 | A1 * | 7/2010 | Lin | G06F 11/1417 713/2 |
| 2013/0097711 | A1 * | 4/2013 | Basavapatna | G06F 21/577 726/25 |
| 2014/0250290 | A1 * | 9/2014 | Stahl | H04L 9/3247 713/2 |
| 2014/0310510 | A1 * | 10/2014 | Potlapally | G06F 9/4406 714/19 |
| 2015/0067402 | A1 * | 3/2015 | Lee | H04L 43/50 714/37 |
| 2015/0381651 | A1 * | 12/2015 | Lietz | G06F 21/55 726/23 |
| 2016/0110550 | A1 * | 4/2016 | Kakii | G06F 21/554 726/23 |
| 2017/0310703 | A1 * | 10/2017 | Ackerman | H04L 63/1425 |
| 2018/0019880 | A1 | 1/2018 | Wu et al. | |
| 2019/0349356 | A1 * | 11/2019 | McElwee | G06F 21/552 |
| 2020/0184089 | A1 * | 6/2020 | Ponsini | G06F 21/606 |
| 2020/0305000 | A1 * | 9/2020 | Obaidi | H04L 67/12 |

FOREIGN PATENT DOCUMENTS

| | | | |
|---|---|---|---|
| WO | PCT-2016/020640 | A1 | 2/2016 |
| WO | PCT-2016/099839 | A1 | 6/2016 |

OTHER PUBLICATIONS

Xu et al.: "Dominance as a New Trusted Computing Primitive for the Internet of Things", Georgia Institute of Technology—Fraunhofer AISEC—Northeastern University—Microsoft Research Mar. 2019, pp. 1-16.

* cited by examiner

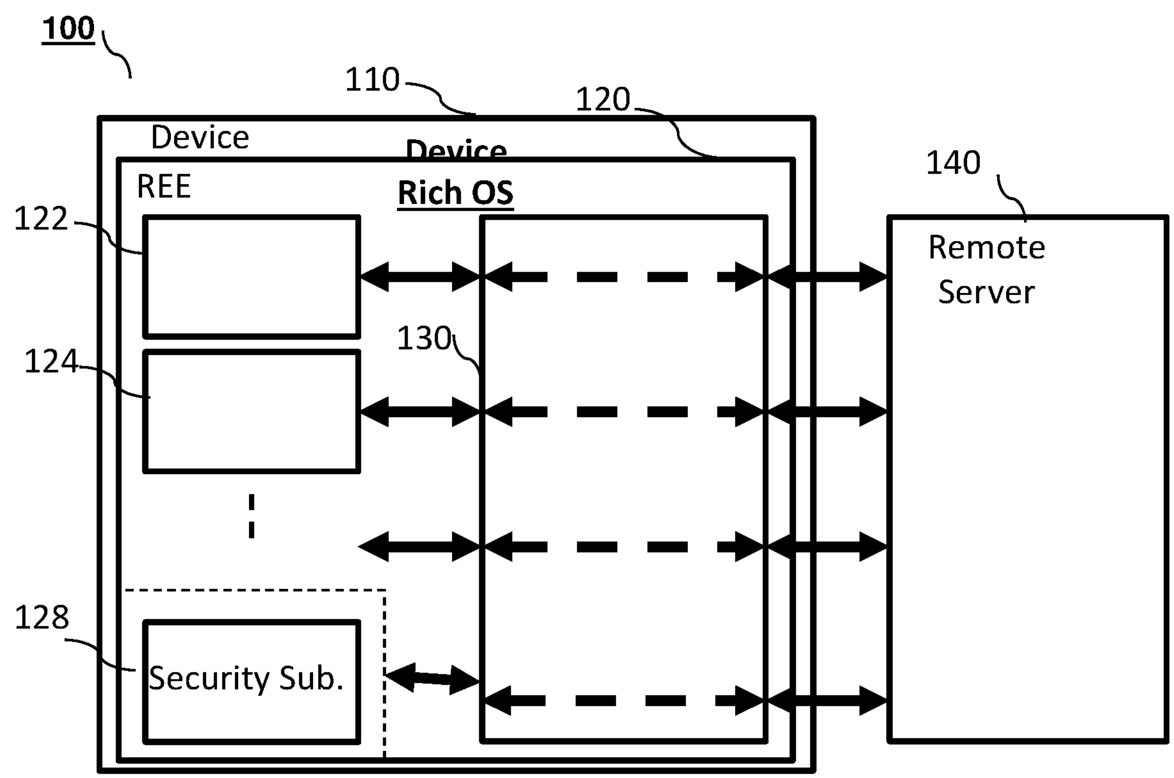
FIG. 1 – Prior art
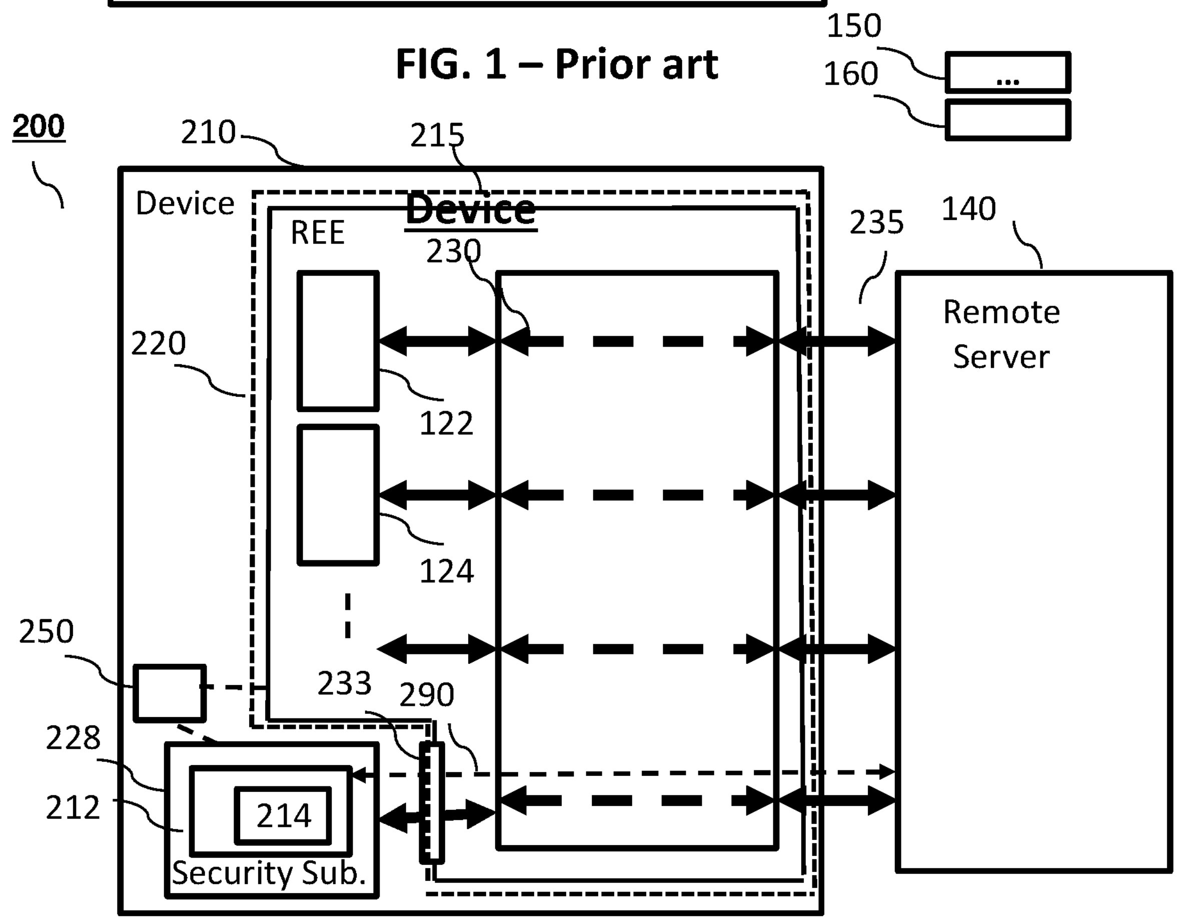
FIG. 2

DEVICE, INTEGRATED CIRCUIT AND METHODS FOR DETECTING, RESPONDING TO AND REMOVING A COMPROMISING ATTACK

CROSS-REFERENCE TO RELATED APPLICATIONS

This application claims the priority under 35 U.S.C. § 119 of European Patent application no. 19306412.8, filed on 30 Oct. 2019, the contents of which are incorporated by reference herein.

FIELD OF THE INVENTION

The field of the invention relates to a device, such as a security device, an integrated circuit, and methods for detecting, responding to and removing a compromising attack. The invention is applicable to, but not limited to, Internet of Things (IoT) systems with both trusted and untrusted components, such as communication stacks, contained in IoT devices.

BACKGROUND OF THE INVENTION

Recent years have seen a huge rise in the number of connected devices, in both every day and industrial settings. This phenomenon, often described as the Internet of Things (IoT), enables billions of devices to support revolutionarily new functionalities. Due to their quantity and spread (e.g., often installed in hardly accessible locations), the management of some such IoT devices may often be performed remotely from a server, without any local interaction. This management process includes, amongst others, the regular deployment of over-the-air (OTA) updates (for example to minimise or reduce risk of malfunction) and/or the capability to execute remote commands on each IoT device.

Concurrently, the huge increase in the number of inter-connected devices provides potential and attractive opportunities for malicious parties to 'attack' a system or set of inter-connected devices, particularly as one successful attack scales to numerous inter-connected devices. For example, such attacks may compromise an attack on one or more of the following: random access memory (RAM) on the IoT device (e.g., the communication stack), the network between a communication stack and a remote server, non-volatile (NV) memory on the IoT device, infrastructure related to (or components) of the IoT device itself (e.g., power supply, interface(s), etc.)

Therefore, a system implementation of such inter-connected devices should ensure that the connection between the remote server and the IoT devices needs to be fresh, authenticated, and integrity-protected (i.e., the attacker cannot forge/replay messages) and enforced. 'Enforced' refers to the fact that compromisation(s) of the device or the infrastructure should not have a long-lasting impact on the management functionality, otherwise an attacker may completely take over the management or functionality of such IoT devices. These devices could/would then, in effect, be irrecoverably lost to the system without local intervention.

A trusted execution environment (TEE) is a secure area of a main processor. The TEE is an isolated environment that runs in parallel with the operating system (OS), providing security for the rich environment. It guarantees code and data loaded inside to be protected with respect to confidentiality and integrity. Generally, the TEE offers an execution space that provides a higher level of security than a rich execution environment (REE), and a higher level of performance and functionality than a 'secure element' (SE). A REE is a software execution environment with several layers for general purpose. This, typically, includes an operating system, user applications, device drivers, and a communication stack for external communication. A SE is a security processor that is a resource-constrained hardware module. Typically, it provides run-time cryptographic services and a key storage. It is also intended to be more secure than a user-facing OS, as it uses a hybrid approach that utilizes both hardware and software to protect data, and therefore offers a level of security sufficient for many applications. Only trusted applications running in a TEE have access to the full power of a device's main processor, peripherals and memory, whilst hardware isolation protects these from user installed applications running in a main OS. Software and cryptographic isolation inside the TEE also protect the trusted applications contained within the TEE from each other.

Referring first to FIG. 1, an example simplified drawing 100 of a known device 110 with a known REE 120 is illustrated. Currently, a number of host applications 122, 124 communicate with a remote server 140 over a communication stack 130. In the device, the communication stack 130 is part of the REE 120 and is assumed to be trusted 160. A Security Subsystem 128 also communicates over the trusted communication stack 130 with the remote server 140. In case of any compromisation of, or attack to, the communication stack 130, the device 110 will be cut off from the remote server 140.

Today's known products that offer management functionality of such a device 110, e.g., Amazon's freeRTOS®, or Microsoft's Azure®, assume that the communication stack on the IoT device is part of the trusted OS (i.e., trusted to always behave correctly). Therefore, a connection to a trusted remote server 140 is always intended to be possible, given network availability. Currently, in such systems, the components that are generally untrusted are the host applications 122, 124. Hence, the host applications 122, 124 are often security checked, with anti-virus programs run and software updates regularly applied. The inventors of the present invention have recognised and appreciated that cybersecurity should be addressed at all levels, rather than just the host applications 122, 124. However, to do so is complex, costly and error-prone.

Furthermore, with the plethora of communication opportunities offered by IoT devices, it is known that some users want to own and manage the entire REE. As a consequence, the inventors have identified that the communication stack 130, itself, is likely to be no longer trustworthy in future applications and, as a result, the functionality may not be guaranteed.

U.S. Pat. No. 8,909,930 B2 proposes a monitoring scheme for an untrusted device from a trusted hardware component. The description of U.S. Pat. No. 8,909,930 B2 focuses on determining a security/trust status of the untrusted device through a series of challenges.

SUMMARY OF THE INVENTION

The present invention provides a device, an integrated circuit, and methods for detecting and removing a compromising attack, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified drawing of a known device with a rich execution environment (REE).

FIG. 2 illustrates a simplified drawing of a device with a REE and security subsystem, according to example embodiments of the invention.

DETAILED DESCRIPTION

Figure 3:
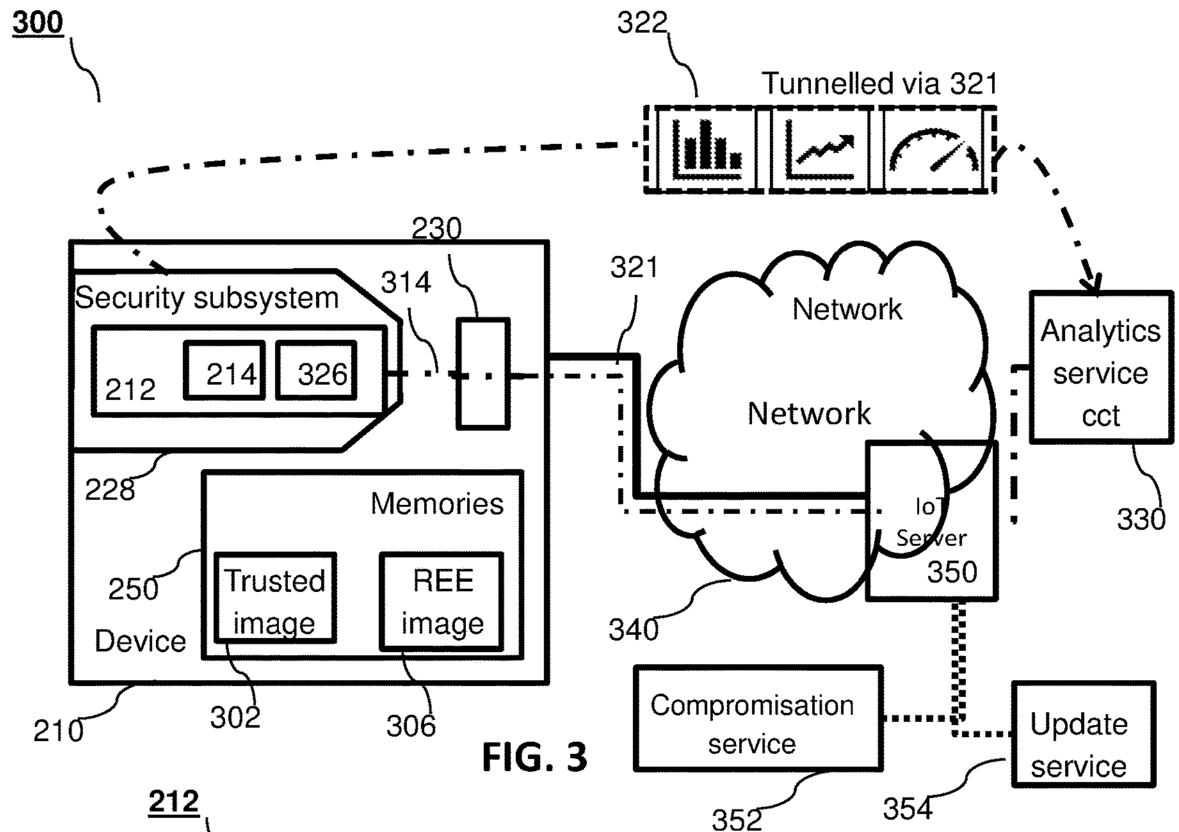
FIG. 3 illustrates a simplified overview block diagram of a hardware system and data flow to detect and at least partially remove a compromising attack, according to example embodiments of the invention.

In order to address at least some of the aforementioned limitations of IoT devices, example embodiments of the present invention assume that many more devices and applications and components (and in some instances everything) running in the REE may be 'untrusted' and can be potentially compromised by an attacker. In this regard, an untrusted device may be considered, in one instantiation, as a rich system on chip (SoC) that contains multi-core central processing units (CPUs), radio circuitry, etc., which are each vulnerable to attack and/or being compromised.

For such cases, example embodiments of the present invention provide a security monitoring and control circuit or component within the device (such as an IoT device) and notably located outside of the REE, which can force the untrusted OS to correctly communicate with, say, a remote server e.g., for updates or commands. The security monitoring and control circuit may be arranged to detect a compromisation of the desired functionality and recover the device/system, by re-establishing a secure link to the remote server.

The inventors have recognised and appreciated a desire for robust mechanisms to remotely manage the security of devices, such as IoT devices, for example through monitoring of the device's activity, analytics and anomaly detection, as well as provide damage control. The inventors have recognised and appreciated that such solutions may be achieved on a local scale and/or on a global scale, for example where 'local scale' refers to the devices themselves performing self-diagnosis to detect anomalies, and 'global scale' refers to, say, cloud services detecting attacks based on information provided by multiple devices. In some 'local scale' examples, it is envisaged that the device itself may be configured to detect that it is not behaving normally (e.g., an attack is in progress) and, in response thereto, react to the abnormal behaviour, e.g., reboot, run some sort of a self-checking procedure, send a message to a server. Furthermore, in some 'local scale' examples, it is envisaged that several devices that are close to each other may be configured to collaborate (e.g. several IoT devices in a household) or that there is a small local server that manages several devices. In some 'global scale' examples, it is envisaged that a server may be configured to monitor many devices and detect that one or some of them started to behave differently from others in an unexpected/unusual way. In another example embodiment, it is envisaged that there might be a further intermediate step whereby multiple devices in a local network collaborate to detect attacks.

Thus, a device (or a system) that is configured to provide for a given functionality comprises one or more untrusted components. Example embodiments of the present invention propose to add a trusted hardware security circuit, coupled to the one or more untrusted components and configured to re-establish a secure connection to a remote server and at least partially remove the compromisation from the device. In response to a detection of a compromisation of the one or more untrusted components, actions are taken by the trusted hardware security circuit in order to control the damage caused by the compromisation and recover the device (or system) to a known, stable, state. In some examples, the one or more untrusted components may be an untrusted communication stack, which in some examples may be located on another processor to the host application. In this case, the trusted hardware security circuit may also help one or more host application(s) to stay connected to the remote server, and not only the untrusted communication stack.

In particular, in some examples the device enforces a periodic connection to the remote server in order to check for updates, transmit status information, and install updates if available. Thereby, it shall always be possible (provided the network/server allows it) to update an IoT device that expels an attacker from the system and fixes vulnerabilities to prevent subsequent compromisations.

In a first aspect, examples of the present invention provide a device, such as a security device that includes at least one host application and a rich execution environment (REE). At least one interface is operably coupled to the REE for communicating with a remote server. A security sub-system comprises a security monitoring and control circuit coupled to the REE and connectable to the remote server via the REE and at least one interface. The security monitoring and control circuit comprises an analytics circuit configured to detect an anomaly following a compromisation of the device. The security monitoring and control circuit is arranged to treat the REE as an untrusted component and in response to a detection of an attack on the REE or a component in the device that is accessible by the REE, the security monitoring and control circuit is configured to re-establish a secure connection to the remote server that tunnels through the REE and, in some instances wholly or at least partially, remove the compromisation from the device.

Notably, in some examples, this re-established secure connection is tunnelled through, say, an untrusted communication stack in the REE. However, in accordance with examples of the invention, untrusted components, such as the untrusted communication stack in the REE, have no means of altering or interpreting any messages sent via the secure connection.

In examples of the present invention, the secure connection that tunnels through the REE to the services may be enforced. In this context, there may be multiple phases of the operation. First there may be an enforced connection between the security monitoring and control circuit coupled to the REE and the remote server. Then due to compromisation of the REE, this connection is interrupted. The security monitoring and control circuit coupled to the REE will detect the compromisation, for example due to the periodically-sent enforcement messages (which will no longer reach the remote server). As a consequence, the security monitoring and control circuit will try to remove the compromisation and re-establish the connection to the remote server. Thus, the removal of the compromisation and re-establishment of the connection to the remote server happens in multiple steps (which in some examples may be user-configurable). First, the removal of the compromisation might be a simple reboot. If this is insufficient the security monitoring and control circuit may also try to place the device into quarantine mode. As a last option, the security monitoring and control circuit may try to boot the device in a failsafe mode in order to install a fresh update. Afterwards, the compromisation is hopefully removed and the connection to the remote server re-established and working again.

In some examples, it is envisaged that the above strategies may also be triggered by the analytics circuit, e.g., in case the device is compromised but where the compromisation does not affect the communication stack. Then the enforcement messages may be sent, but the device behaviour is still different (which will be detected by analytics).

In examples herein described, mechanisms are provided to restore/improve the security status of the untrusted device. Furthermore, the claimed invention differs from the teaching of U.S. Pat. No. 8,909,930B2 by assigning an untrusted status to the REE. Additionally, the examples herein described assess the behaviour of the untrusted device in a more flexible and intelligent manner, in that the security monitoring and control circuit allows an incorrect response, so long as there is at least one correct response in a certain time frame. This flexibility facilitates configuring of various device recovery actions according to the level of compromisation.

In some examples, the security monitoring and control circuit may be configured to employ the re-established secure connection to the remote server for deployment of at least one of: at least one update, or at least one execution of a remote command received from the remote server on the device. In this manner, reliable and trusted updates may be received by the device and employed, which in some instances may at least partially remove any malicious attack or compromisation of the device. In this manner, the remote server may still be able to provide some control of the device, despite a malicious attack or compromisation of the device. In some examples, it is envisaged that such secure connections are also conceivable to serve other services, e.g., enforced monitoring through enforcing the regular sending of device data to, say, the cloud.

In some examples, the security monitoring and control circuit may include at least one of: at least one timer comprising at least one timer threshold, at least one counter comprising at least one counter threshold, such that a detection of a compromisation of the REE may be identified following a detection of anomalous behaviour of one or more untrusted component(s) of the device by determining when a timer threshold or a counter threshold has been exceeded. In this manner, the security monitoring and control circuit may be able to use the timers and/or counters to determine whether a compromisation of the device's security, e.g. the REE or a component that is accessible by the REE, has been compromised. In some examples, the timer threshold(s) and counter threshold(s) may be configurable by the user and in some examples may be adapted based on the host application that is being used. In some examples, the thresholds may be configured by taking into account the type of host application as well as the underlying platform. For example, in certain scenarios the device will only have a working connection to the internet irregularly, say once a week. In such scenarios, the customer may want to set a higher threshold to avoid false positives. In other cases with a permanent connection, the customer may want to use a shorter threshold, in order to obtain a quicker detection of a compromisation of the connection.

In some examples, in response to a detection of a compromisation of the REE, the security monitoring and control circuit may perform an action to place the device, and in some examples the REE, into a trusted operational state. For example, the security monitoring and control circuit may perform an action to place the device into a trusted operational state by performing one of the following: rebooting at least a part of the device; running a self-check routine of one or more of the device's circuits and components; communicating with the remote server; limiting the capabilities of the device whilst maintaining some functionality (e.g. quarantine mode); forcing the device to boot a trusted image that enables maintenance of the device (e.g. entering a failsafe mode); and/or allowing the device to receive a secure update or command from the remote server. In this manner, the security monitoring and control circuit may be able to still control at least some functionality of the device, after a compromisation, and implement one or more mechanisms to limit the damage and/or recover the device (or parts thereof) back to a reliable and potentially trusted state. In this manner, the device may optionally achieve blocking of communications during a self-checking routine.

In some examples, the security monitoring and control circuit may perform an action to place the device into a trusted operational state based on at least one user-configurable attribute or user-configurable parameter in the security monitoring and control circuit. In this context, in some examples, the user-configurable parameters may encompass parameters such as sampling rate, whether (or not) to use pre-processing, a frequency of sending data (such as statistics). In some examples, data may be considered as sensitive, and thus may be flagged by a user; in this case it may not be sent to the main server but would only be processed locally. In some examples, it is envisaged that a user may also configure scheduling of transmissions, for example where the schedule may stipulate that it is not allowed to place the device in a quarantine mode during certain hours of a day or on specific dates. In this context, a user-configurable attribute may also include performing an anomaly detection model, and/or using timer and counter thresholds, and/or triggered by a remote command, as well as applying a quarantine policy. One benefit from applying a quarantine policy may be a prevention of further infection/damage, whilst keeping some functionality, for example as configured by the customer/user. A further benefit of such an approach is that a secure connection to the server may be ensured, if the network allows it, even if the device is compromised. Furthermore, in this manner, the device behaviour to react to a detected compromisation may be tailored to minimize any impact on the host application. Additionally, in accordance with some examples of the invention, a user-configurability of one or more attributes may enable a developer/administrator of the system to specify some safety margins that can be application-specific e.g., 'it is not allowed to reboot the device between 8:00 and 16:00'.

In some examples, the security monitoring and control circuit may be implemented as one of the following: separate hardware or firmware part of the device, physically isolated from the REE; configured to run as part of a hypervisor that runs on hardware coupled to the REE; configured to run in a trusted virtual machine on a hypervisor. In this manner, examples of the invention may be instantiated on a variety of different SoC architectures.

In a second aspect, examples of the invention describe an integrated circuit for a device. The integrated circuit includes an interface arranged to couple to: at least one host application and a rich execution environment (REE) for communicating with a remote server. A security sub-system comprises a security monitoring and control circuit that is coupled to an analytics circuit configured to detect an anomaly following a compromisation of the device. The security monitoring and control circuit is arranged to be coupled to the REE and connectable to a remote server via the REE and the interface. The security monitoring and control circuit is arranged to treat the REE as an untrusted component of the device. In response to a detection of a compromisation of the REE or a component in the device that is accessible by the REE, the security monitoring and control circuit is configured to re-establish a secure connection to the remote server via the interface that tunnels through the REE and at least partially removes the compromisation from the device.

In a third aspect, examples of the invention describe a method for a security device. The method includes: communicating with a remote server by and via a rich execution environment (REE). The method further includes: treating the REE as an untrusted component by a security monitoring and control circuit coupled to the REE; detecting a compromisation of the REE or a component in the device that is accessible by the REE, and in response to a detection of a compromisation of the REE, re-establishing a secure connection to the remote server from the security monitoring and control circuit that tunnels through the REE and removing the compromisation from the device.

Thus, examples of the present invention provide a device, an IC and a method to detect and evict an attacker from a compromised device. In this manner, the device can always be remotely maintained, as the attacker cannot simply block the device whilst performing an attack, as the attack will be noticed by the device itself. Thereafter, the attacker either would not be able to continue the attack (e.g. where connections are blocked) or the attacker will be evicted from the device (e.g., because of a reboot).

Although examples of the invention are described with reference to a device that is compliant with IoT, it is envisaged that examples of the invention may equally be employed with any device that employs a rich execution environment and may be compromised/attacked. Although examples of the invention are described with reference to a device that receives updates or remote commands from a remote server, it is envisaged that examples of the invention may equally be employed with any device that communicates with a remote server for any other reason and yet still may be compromised/attacked. Although examples of the invention are described with reference to a device that transitions through a number of possible options to recover to a stable, trusted state, it is envisaged that examples of the invention may equally be employed with fewer or more options to recover the device to a trusted state. Although examples of the invention are described with reference to a device having an analytics circuit that is configured to monitor the device's activity and detects an anomaly following a compromisation of the device by identifying a change in the data or behavior of the device's activity, it is envisaged that examples of the invention may equally be employed with other approaches to detect a compromisation, e.g. receiving a warning of an existing or imminent compromisation.

Some examples of the invention are also described with reference to device recovery. In this scenario, examples of the invention are directed to a complete (or partial) removal of any compromisation from the device (or system) and a resumption of the totality (or partial) of the device's functionality (for example in some applications as desired or dictated by a user).

Examples of the invention are also described only with reference to compromisations caused by a remote adversary. In particular, this excludes physical access to the device, which would enable local tampering. Furthermore, in examples of the invention, the REE is defined, say, as the primary point of attack for these remote adversaries, either directly or via components in the device that are accessible by the REE. Therefore, parts of the system that are accessible by the REE are considered to be part of a compromisation.

Perceived attacks or threats from a remote adversary, which may compromise parts of the device, include for example one or more of the following:

(i) Malware resides in RAM but is expected to be removed upon reboot;

(ii) Malware either resides in unauthenticated NV or the device is bricked;

(iii) Infrastructure attacks (all except network), for example where a power loss can be forced. One example of this could be a building power management system that can be compromised, to force a cold boot on the IoT devices in the building.

(iv) Network related attacks, such as a router in the network or a malicious node arranged to filter server connection attempts and re-infect devices directly after reboot.

(v) Server attack, where the server updater circuit is no longer reachable by the device.

It is known that such attacks, although perhaps not directed to the REE, may still affect any updateability processes of the device. Thus, if one part of the system is compromised, it may affect the functionality of the updating procedure and/or REE.

In some examples, it is envisaged that the security and monitoring circuit may be implemented using discrete components and circuits, whereas in other examples the circuit may be formed in integrated form in an integrated circuit. In some examples, the security and monitoring circuit may be implemented, in whole or in part, using hardware, firmware or software. As the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Referring first to FIG. 2, an example simplified drawing 200 of a device 210 (such as an IoT device) with a rich execution environment (REE) 220, is illustrated according to example embodiments of the invention. The device 210 includes a number of host applications 122, 124 that communicate with a remote server 140 over a communication stack 230 and via one or more communication interface(s) 235. In the device 210, in this example, the communication stack 230 is part of the REE 220 and is assumed to be untrusted. The one or more communication interface(s) 235 is/are also assumed to be untrusted. In this example, the device further includes one or more memories 250, which may be of one or more memory types, such as:

(i) Random access memory (RAM), where the data contained in which is destroyed at every reboot;

(ii) Scratchpad, which survives a reboot but loses its content in case of a power loss;

(iii) Non-volatile (NV) memory, which survives a power loss

A Security Subsystem 228 also communicates over the untrusted communication stack 230 with the remote server 140. The security subsystem 228 includes a security monitoring and control circuit 212 that is configured to react to a detected compromisation of, or attack to, an untrusted component, such as the communication stack 230, as described hereafter.

In some examples, the security monitoring and control circuit 212 may be arranged to enforce a trusted connection between the remote server 140 and the IoT device 210, e.g., for the regular deployment of updates or the execution of remote commands on the IoT device 210 (which can in turn contribute to a trust elevation). In this manner, a user is able to own and manage the entire REE 220 to the extent that the security monitoring and control circuit 212 ensures that the trusted components and applications, as well as the untrusted components and applications, are able to reliably and securely communicate to a remote trusted server.

Thus, a security monitoring and control circuit 212 is included as a part of the security sub-system 228 within the device 210, which monitors whether (or not) the untrusted communication stack 230 in the REE 220 is behaving correctly, or at least as expected. In some examples, the security monitoring and control circuit 212 may use timers and counters in order to detect anomalous behaviour of any one or more untrusted component(s). Once the security monitoring and control circuit 212 detects anomalous or erroneous behaviour, the security monitoring and control circuit 212 will take actions to return the device/system to a trusted state in which the untrusted component is working properly. In some examples, these actions performed by the security monitoring and control circuit 212 strongly depend upon the application, domain, and platform employed by the device 210. In some examples, these actions may be dictated by attributes or parameters (such as timer and counter thresholds, detection model, etc. as mentioned previously) in the security monitoring and control circuit 212 configured by users depending on their requirements.

In some examples, these actions may include rebooting the (or a part of the) device 210, or running a self-check routine, or communicating with the server, or placing the device into a special 'base' state or mode of operation, e.g. place the device 210 into a trusted 'base' state to prevent further compromisation or to allow the device to receive a secure update or command from the server, such as trusted installation of updates. Such a placing of the device into a special state or mode of operation may include, for example, placing the device into a quarantine mode (e.g., where functionality of the system is not, or only marginally, restricted, while quarantining the compromisation, i.e., preventing a further spread), or forcing the device to boot into a failsafe mode (e.g. a trusted recovery image that guarantees a connection to the remote server 140, assuming the network allows it).

In some examples, the security monitoring and control circuit 212 may force the system to enter one of these states or modes of operation, either directly or with a help of a separate trusted system management module. A skilled artisan will recognise and appreciate that this list of potential actions is not exhaustive and can be extended if necessary. In general, the configurable actions all follow the goal of detecting and/or confirming (e.g. confirming that a detection of a compromisation has happened, and not just an error), and/or removing a compromisation of the system. In some examples, these actions may also be configurable and depend on the severity of the detected compromisation.

It is envisaged that, in some examples, the security monitoring and control circuit 212 may be implemented in a separate hardware or firmware part of the device, physically isolated from the REE 220. In this example, the security monitoring and control circuit 212 might be attached to the security subsystem 228 of the device 210 or system on chip. In a second instantiation, the security monitoring and control circuit 212 might be configured to run as part of a hypervisor, which runs on the hardware, and between the hardware and the REE. In a third instantiation, the security monitoring and control circuit 212 might be configured to run in a trusted virtual machine (VM) on a hypervisor. In this case, the security monitoring and control circuit 212 might be configured to run vertically on the same level as the REE 220, but can still perform its tasks, assuming the hypervisor is secure. In a fourth instantiation, the security monitoring and control circuit 212 might be configured to run in a secure world and isolated from the REE 220 by an application, such as TrustZone™.

Also for example, in one embodiment, the illustrated examples may be implemented as circuitry located on a single integrated circuit 215. For example, the integrated circuit 215 for device 210 includes at least one host application 122, 124 that is arranged to provide at least one operational function of the device 210. In this example, the integrated circuit 215 may include the security monitoring and control circuit 212 that may comprise an analytics circuit 214 configured to detect an anomaly following a compromisation of the device 210. The security monitoring and control circuit 212 is arranged to treat the communication stack 230 as an untrusted component of the device 210. In response to a detection of a compromisation of the communication stack 230, or a component in the device 210 that is accessible by the communication stack 230, the security monitoring and control circuit 212 is configured to re-establish a secure connection to the remote server 140 via an interface 233 that tunnels 290 through the communication stack 230 and at least partially remove the compromisation from the device 210. Tunnelling 290, in this context, encompasses re-establishing a secure end-to-end protected channel from the security monitoring and control circuit 212 to the trusted remote server 140, relying on the untrusted communication stack of the communication stack 230 to connect to the network. The communication stack 230 is unable to read or modify the messages that pass through this (tunnelled) secure end-to-end protected channel.

Alternatively, in other examples, the integrated circuit 215 and/or component examples therein may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type.

Referring now to FIG. 3, a simplified overview block diagram of an example hardware system 300 configured to detect and at least partially remove a compromising attack is illustrated, according to example embodiments of the invention. The hardware system 300 is configured to detect and at least partially remove a compromising attack and includes a device 210 having a security monitoring and control circuit 212, which is arranged to acquire and communicate local data acquisition information. A communication stack 230 uses a protocol to tunnel a secure channel 314 that is fresh, authentic, integer and confidential and that is connected to a network 340 via an interface 235 and uses a transport medium 321. In this context, the security monitoring and control circuit 212 configures and uses the protocol such that:

(i) freshness prevents old messages being re-played by an attacker in a later connection;

(ii) authenticity prevents an attacker from impersonating any of the parties, i.e., the receiver can be sure that the message comes from the assumed sender;

(iii) integrity-protection prevents the data being altered or corrupted during sending; and (iv) confidentiality prevents an attacker from reading or interpreting the data during sending.

Although, in examples described herein, the communication stack 230 uses a protocol to tunnel a secure channel 314 that is connected to a network 340 via an interface 235 and uses a transport medium 321, it is envisaged that in other examples there may be multiple levels to the communications created by communication stack 230, which extend to different parties. In this example, the transport medium 321 is between remote IoT server 350 and the device's communication stack 230. Within the transport medium 321, examples of the invention propose a creation of a secure channel 314, starting from communicator 326 and routing to many other services, for example monitoring and analytics service circuit 330, a compromisation service 352, and an update service 354. Furthermore, it is envisaged that within secure channel 314, there is a virtual channel to exchange data denoted as communication link 322 which traverses to the monitoring and analytics service circuit 330, which in examples of the invention is the monitoring component on the device 200 that secure channel 314 gives the data to. It is envisaged, therefore, that there are other virtual channels (not shown for explanatory reasons only) that are similar to communication link 322 and route to other services and circuits and devices, e.g., for obtaining updates.

The network 340 is connected to, or includes, a remote IoT server 350, which in this example is connected to a monitoring and analytics service device that receives data from the security monitoring and control circuit 212. In this example, the remote IoT server 350 handles security metrics performance activity, including a recovery from a compromisation service 352, and an update service 354, which provides some updates according to a predetermined rule or process and, for example, in response to a detected compromisation. The device 210 includes a memory 250, such as an NV memory, which contains a secure, trusted (update) image 302 for use by the security monitoring and control circuit 212. In some examples, the trusted image 302 is stored in an access-controlled part of the device 210 and cannot be accessed from the communication stack 230. In some examples, the trusted image 302 contains a basic operating system (OS) with only very basic functionality to allow it to connect to the remote IoT server 350. The memory 250 also contains a REE image 306. In some examples, the REE image 306 may help with downloading and installing available updates. Thus, in accordance with some examples of the invention, the security monitoring and control circuit 212 may be configured to be the trusted state part of the device 210 in which it is incorporated.

The foundation of any update process is to obtain correct and comprehensive gathering of information about the currently installed (firmware) images and REE image versions, such as trusted image 302. Such images are used to determine if an update by the security monitoring and control circuit 212 may be necessary. Therefore, this type of information is critical for the security of the device 210 and should be extracted from a trusted source, such as by or from the security monitoring and control circuit 212. In some examples, and depending on the scenario, this capability to extract information from a trusted source may be achieved in different ways, e.g., storing the container versions during a secure boot process. In accordance with some examples of the invention, the format of the extracted information (e.g., software versions, hashes, chain of hashes, etc.) may be configurable, say by a controller and/or may be set by a user via the communication channel 321 and interface 235 and the communicator 326.

In this example, the monitoring and analytics service circuit 330 is configured to perform a secure and trusted monitoring of the device's activity, and in some examples perform anomaly detection of the operation of the communication stack 230 (e.g. an untrusted communication stack) or a component or circuit that is accessible by the communication stack 230. In some examples, the anomaly detection of the operation of the communication stack 230 or a component or circuit that is accessible by the communication stack 230 may be performed using Machine Learning and performed on a local scale (for the communication stack 230 or relevant circuit or component accessible by the communication stack 230) and/or on a global scale across the whole device 210 and REE-related circuits.

In examples of the invention, once a compromisation is detected, which in some examples may be detected by monitoring and determining by the security monitoring and control circuit 212 an anomaly in the communication stack 230 or a component or circuit accessible by the communication stack 230, the security monitoring and control circuit 212 may instigate direct communication with the monitoring and analytics service circuit 330, highlighted as a communication link 322 that is a virtual representation of the tunnelled information.

In some examples, once a compromisation is detected, the security monitoring and control circuit 212 may be configured to prevent spread of infection and limit the damage (e.g., Distributed Denial of Service (DDoS)) by forcing the communication stack 230 to enter into a quarantine mode. In some examples, the security monitoring and control circuit 212 may be configured to further limit the capabilities of device 210, e.g. block the network access via the communicator 326 of security monitoring and control circuit 212 that is configured to create secure channel 314 or the interface 235, whilst keeping certain functionality of the device 210 operational.

In this example, the security subsystem 228 comprises a security monitoring and control circuit 212 comprising an (local) analytics circuit 214 configured to detect an anomaly following a compromisation of the device 210. The security monitoring and control circuit 212 is arranged to treat the communication stack 230 as an untrusted component. The local analytics circuit 214 may be trained with pre-determined or 'normal' data, in order to detect subsequently, following a compromisation, any anomaly or 'abnormal' data or behaviour of the current data compared to the pre-determined or normal data. Thus, the local analytics circuit 214 may be configured to analyse all the local data that it receives, in order to identify any anomaly or 'abnormal' data or behaviour.

In response to a detection of a compromisation, the security monitoring and control circuit 212 is configured to protect the communication link/channel (that traverses from security subsystem 228 to monitoring and analytics service circuit 330), which is virtually tunnelled through the secure channel 314 and highlighted as a virtual communication link 322 that is a virtual representation of the tunnelled information which traverses the network through transport medium 321. In examples of the invention, the communicator 326 of security monitoring and control circuit 212 is configured to create secure channel 314 that traverses transport medium 321.

In examples of the invention, the secure channel 314 is tunnelled and provides the aforementioned security properties: authenticity, confidentiality, etc. (highlighted as a communication link 322 that is a virtual representation of the tunnelled information), and thus protects against modification and potentially eavesdropping by any untrusted part. In this manner, any communication on this protected (tunnelled) communication channel 322 does not need to rely on any potentially compromised circuits and communicates direct, in this example, with the monitoring and analytics service circuit 330 in or operably coupled to a remote server. In this manner, the security monitoring and control circuit 212 is able to recover the device 210 from any compromisation situation or event, particularly an attack against a communication stack 230 or a component or circuit accessible by the communication stack 230.

In some examples, once a compromisation is detected, the security monitoring and control circuit 212 may be configured to perform frequent (e.g. periodic) checks for any updates that need to be applied to any components or circuits within the device 210, which it is able to obtain from the monitoring and analytics service circuit 330. Thus, in one example, the security monitoring and control circuit 212 is configured to enforce an update connection. In this manner, a goal of the components in the device 210 is to provide a mechanism to perform secure updates, even if parts of the device 210 (or system) are affected by an attack.

In accordance with some examples of the invention, the security monitoring and control circuit 212 may be configured to support a secure update process, for example, a secure update process that consists of one step or multiple steps that strongly depend on the target platform and application, for example download of one or several images, local parsing and validation, adapting memory access control, and proper installation.

In some examples, the security monitoring and control circuit 212 enforces a periodic connection to the remote server, e.g. monitoring and analytics service circuit 330, in order to check for updates, transmit status information, and install updates, if available. In this manner, it shall always be possible (provided the network/server allows it) to update a device 210, such as an IoT device 210 that expels an attacker from the device (or system) and fixes any vulnerable parts to prevent subsequent compromisations. This allows the 'recovery' of a device, such as an IoT device 210, from any compromised state.

In accordance with some examples of the invention, the security monitoring and control circuit 212 may also be configured with robust and secure memory 250. In examples of the invention, the memory 250 can be made secure (protected from adversarial manipulation) through some measure of access control implemented on the SoC. This can either be achieved through a hypervisor, or a hardware access control mechanism like TrustZone® Address Space Controller. It is important that only trusted entities can change the configuration of these measures. The data inside the memory 250 should also be protected from adversarial manipulation, independent of how it is stored (i.e., random access memory (RAM), Scratchpad, non-volatile (NV)). Furthermore, in some examples, the writing to protected NV may be hardened against any sudden power loss during a write process (known as 'anti-tearing') and take page wear-out into account.

If a compromisation is detected in the memory 250, and is in an NV memory part, the security monitoring and control circuit 212 may be configured to request and install updates. If the NV memory is not compromised, the security monitoring and control circuit 212 may be configured to perform a reboot or device reset. If a compromisation is detected in the communicator 326 of security monitoring and control circuit 212 that is configured to create secure channel 314, such that the attacker prevents a connection to the remote (update) server, which in this example is the monitoring and analytics service circuit 330, or when the security monitoring and control circuit 212 detects that no connection to the remote services has happened for a defined period of time, then the security monitoring and control circuit 212 may place the communicator 326 of security monitoring and control circuit 212 that is configured to create secure channel 314 into a configurable Safe mode, and then update and reboot the communicator 326 to a normal mode of operation. In this manner, the security monitoring and control circuit 212 provides an improved, strengthened secure sub system and ensures long term, remote and cost efficient device maintenance through enhanced anomaly detection, improved damage control and a robust recovery mechanism. In some examples, enhanced anomaly detection may also analyse past data (e.g., from the last 5 minutes). In some examples, where there is no "pre-trained data", a Machine Learning model may be used. Here, during the analysis, current data may not simply be compared with some previously recorded data; in contrast several statistics may be computed on the current data using say, a form of a 'fingerprint' (machine learning) of how the data would be expected to appear. Also, and notably, the security monitoring and control circuit 212 is configured to act independently, based on its policy and service commands, and is not a 'slave' of the REE 220 or host applications.

A skilled artisan will appreciate that the level of integration of circuits or components may be, in some instances, implementation-dependent. It is envisaged that the various components within the device 210 can be realized in discrete or integrated component form, with an ultimate structure therefore being an application-specific or design selection.

Figure 4:
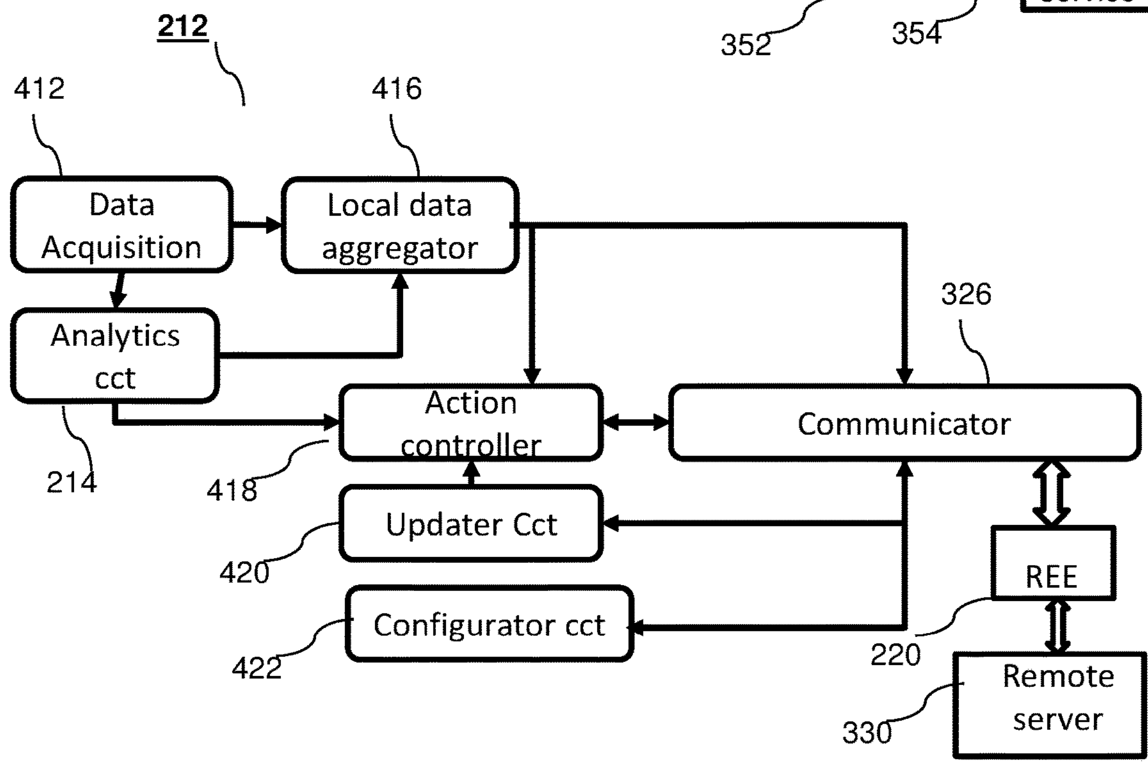
FIG. 4 illustrates a simplified example block diagram of a security monitoring and control circuit and at least one untrusted component, according to example embodiments of the invention.

Referring now to FIG. 4, a simplified example flow diagram 400 of a device with a trusted circuit, such as a security monitoring and control circuit 212 of FIG. 2 and FIG. 3, and at least one untrusted component, such as communication stack 230, is illustrated, according to example embodiments of the invention. The example flow diagram includes data acquisition 412, say performed by a data acquisition circuit, which routes acquired data to a local data aggregator circuit 416, and a local analytics circuit 214. The local data aggregator circuit 416 aggregates all the data that it receives and passes the aggregated data to an action controller 418 that determines whatever action the device needs to take in response to the aggregated data. In addition, in some examples, the raw acquired data or the aggregated data from local data aggregator circuit 416 may be forwarded via the communicator 326 of security monitoring and control circuit 212 to a remote server for, say, analytics in the cloud, such as to the monitoring and analytics service circuit 330 in a remote server of FIG. 3.

Furthermore, and in accordance with some examples of the invention, the local analytics circuit 214 may be trained with pre-determined or 'normal' data, in order to detect subsequently, following a compromisation, any anomaly or 'abnormal' data or behaviour. Thus, the local analytics circuit 214 analyses all the local data that it receives, in order to identify any anomaly or 'abnormal' data or behaviour and passes the results of the analysed data to the action controller 418 that determines whatever action the device needs to take in response to the analysed data. In addition, the action controller 418 may also effect any updates, include executing remote commands from the server, that it may receive from an updater circuit 420, for example as received from a remote server, and via REE 220 and communicator 326 (which creates secure channel 314), interface 235 and the communication channel 321, in response to the security monitoring and control circuit 212 of FIG. 2 and FIG. 3 identifying a compromisation.

Additionally, in accordance with some examples of the invention, the updater circuit 420, may be configured to support a secure server connection via the REE 220 and communicator 326 by use of additional security measures, such as nonce, digital signature, etc. In particular, in this manner, the communication channel may ensure mutual authenticity, freshness, and integrity of the sent messages. A configurator circuit 422 may also receive information from a remote server in response to the security monitoring and control circuit 212 of FIG. 2 and FIG. 3 identifying a compromisation from the remote server and via the communicator 326 of security monitoring and control circuit 212 that is configured to create secure channel 314 and the communication channel 321.

Figure 5:
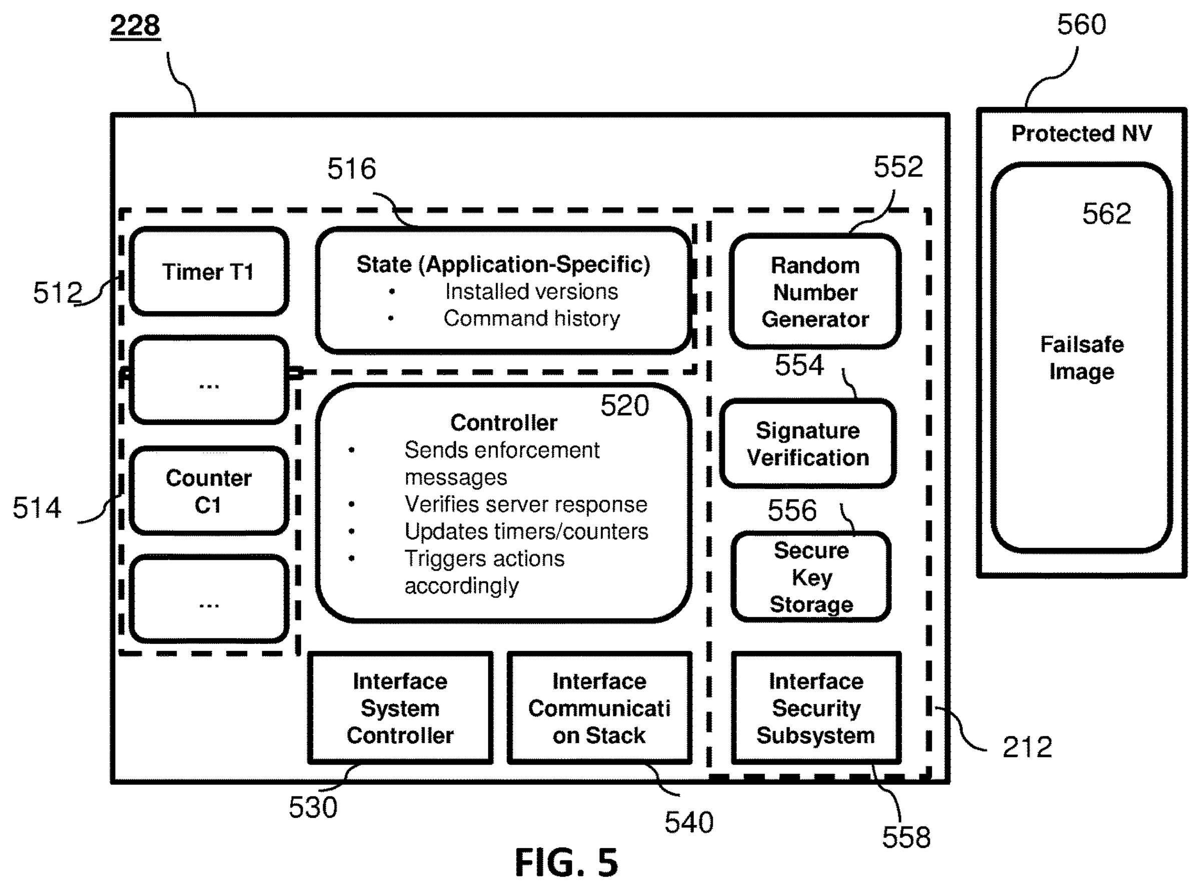
FIG. 5 illustrates an example of a detailed drawing of a security monitoring and control circuit, including timers and counters, according to example embodiments of the invention.

Referring now to FIG. 5, an example instantiation of a security sub-system 228 having a security monitoring and control circuit 212 configured to detect a compromisation and accordingly trigger one or more actions, according to example embodiments of the invention, is illustrated. It is envisaged, and will be appreciated by skilled artisans, that other instantiations will be able to benefit from the concepts described herein, for example, and may be application-specific dependent (and controlled by state machine 516 that tracks command history and maintains a version of the installed hardware/software) and/or may be configurable by a user.

In this example, the security monitoring and control circuit 212 may include one or more of: a random number generator 552, a signature verification circuit 554, a secure key storage component 556, an interface to the security sub-system 558, etc. The security sub-system 228 includes a controller 520 configured to, inter alia, send enforcement messages, verify server responses, provide control of updates, and/or timers/counters and instigate (e.g. trigger) remedial action accordingly. The security sub-system 228 may also include an interface communication stack 540 and an interface system controller 530. In this example, the security monitoring and control circuit 212 may also be coupled (or connectable) to a protected NV memory 560, which may be configured to store, say, a failsafe/trusted image 562.

In this example, various mitigation strategies are considered. The various mitigation strategies may pursue a goal of countering different levels of compromisation, e.g. compromising the REE, compromising an interface connected to the REE, compromising memory connected to the REE, etc. The various mitigation strategies may include configuring one or more private channels for data acquisition purposes, and/or exerting control over a secure boot or update process. The various mitigation strategies may include employing an analytics accelerator (in hardware, firmware or software) and/or employing a processor and memory as part of the security sub-system. In some examples, an analytics hardware accelerator is a circuit that computes some useful function (such as machine language (ML) inference or a part of it). The main purpose of an analytics hardware accelerator is twofold: first, that the circuit can work in parallel with the rest of the system and thereby not use valuable CPU time and secondly that it computes the desired function faster than its software implementation equivalent. The various mitigation strategies may include MRAM to configure a state of the device or for provisioning purposes or use of security keys.

The various mitigation strategies may also employ one or more timers 512 and/or counters 514 that identify/identifies a compromisation event due to an expiration of the one or more timers 512 and/or exceeding a counter threshold in, say, an update procedure. Such events may be used to trigger one or more mitigation strategies in response to a perceived compromisation. In some examples, it is also envisaged that that these examples of various mitigation strategies may be configured by the user.

In some examples, it is noteworthy that the security monitoring and control circuit 212 may also request the device or REE entering a quarantine or failsafe mode (based on, say, the failsafe image 562) independent of the update counters 514, e.g., after an analytic circuit detected a compromisation.

An error in an update procedure (e.g., one of the timers (T1, T2) 512 expires) in normal mode may lead to an increment of the security monitoring and control circuit 212 counters 514 and a subsequent action taken by the security monitoring and control circuit 212 update circuit. For example, in some examples, this may force a reboot of the device (for example in order to at least partially remove, say, malware stored in RAM) or simply evaluating again a value of the one or more counter(s) 514. Other envisaged examples to remove a compromisation include installing an update to remove compromisation of NV memory, resetting parts of the device (i.e. not a complete reboot), contacting the remote server to receive recovery commands, etc. Consecutive errors in normal mode (i.e., where the regular update functionality is disrupted) will lead to an increase in counters until they exceed a certain first threshold. At this point, the device may be configured to not be able to update for some time, as the security monitoring and control circuit 212 may consider that it might be under attack.

In accordance with some examples of the invention, in response to a determination that the device's RAM may have been compromised, e.g. by attacking the REE or changing network settings, the security monitoring and control circuit 212 may be configured to monitor whether the REE is (or is capable of) communicating with the remote server and in response thereto may penalize misbehaviour. In some examples, in such a case, the security monitoring and control circuit 212 may be configured to log a number of update failures, and react accordingly.

In some examples, a first mitigation step, the security monitoring and control circuit 212 may restrict the capabilities of the device and put it into quarantine mode. This should allow the device to function while preventing further infection by e.g., by restricting network access. In an alternative (or additional) example, the first mitigation step may be, say, a reboot operation. After a certain timeframe, the device will again try to install updates. If this fails again, the counters in FIG. 5 are further increased, and the device is placed (or stays) in quarantine mode. If the update succeeds, the device will be up-to-date and can return to normal mode. Consecutive update errors in quarantine mode could indicate a compromised NV of the updater client. Therefore, when the counters 514 exceed a specific second threshold, the device may be booted into failsafe mode to allow recovery even from such scenarios.

As a second mitigation step, the device may boot into failsafe mode using failsafe/trusted image 562, which is considered as being unable to be compromised from normal or quarantine mode. Therefore, it is trusted to analyze the state of the device, download updates, and install them. If the update procedure is completed successfully, the device will again be up-to-date and can be booted into normal mode. If the update procedure fails even in failsafe mode, it will indicate that there is a problem with either the network or the server. To allow limited functionality, whilst still protecting the device from infection, the counters 514 may be then reset to the first specific threshold to enable booting into quarantine mode. Thereafter, in accordance with some examples of the invention, the cycle between quarantine and failsafe mode will be kept alive until an update procedure was successfully completed.

If the attacker was able to reset the counters 514, (s)he may be able to circumvent most of the mitigation measures. Therefore, in some examples of the invention, the counters 514 need to be protected from power loss, if the infrastructure was compromised. In some examples, this can be achieved by either implementing the counters 514 in NV or directly booting into a special mode after a power loss. The latter would mean that the device never boots into normal mode after a power loss without completing an update procedure. Without NV storage, this may be realized via, say, a scratchpad switch (not shown), which is checked at startup. If such a switch is not set, then the device directly boots into a special mode without comparing the counters. After one complete run independent of the success of the update procedure, the switch is set to a specific value. In this way, the device will not be forced to boot into a special mode based on the switch and the boot procedure is completely determined by the counters. A preferred solution is to store the counters in protected NV, thereby not requiring a scratchpad switch.

Figure 6:
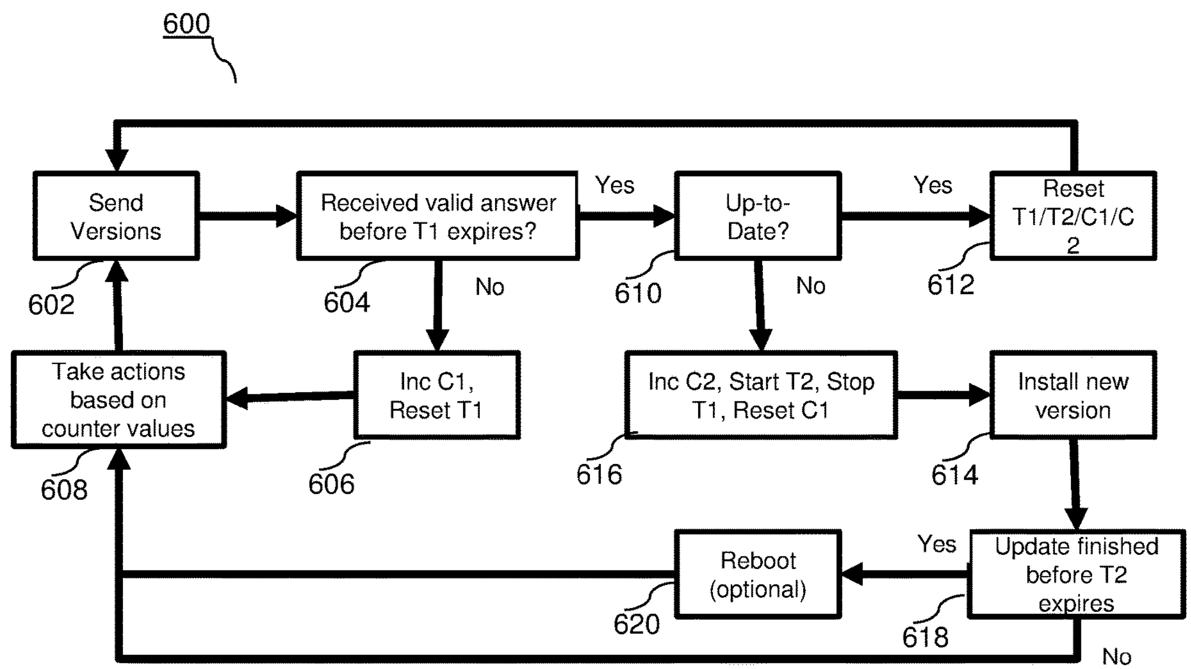
FIG. 6 illustrates an example flow chart for enforcement of updates following a detection of a compromising attack, according to example embodiments of the invention.

Referring now to FIG. 6, an example flow chart 600 for enforcement of updates following a detection of a compromising attack is illustrated, according to example embodiments of the invention. In this example, versions of updates are relayed at 602 to say, security monitoring and control circuit 212 of FIG. 2 and FIG. 3 and a first timer is commenced and a first counter set to a fixed value, e.g. zero. At 604, a determination is made as to whether security monitoring and control circuit 212 has received a valid answer from the trusted server before a first timer has expired. If at 604, there is a determination that the security monitoring and control circuit 212 has not received a valid answer from the trusted server before a first timer has expired, then a first counter is incremented and the first timer reset at 606. The security monitoring and control circuit 212 of FIG. 2 and FIG. 3 then takes actions based on the counter value(s) at 608 and the process loops to 602. If at 604, there is a determination that the security monitoring and control circuit 212 has received a valid answer before a first timer has expired, then a determination is made by the security monitoring and control circuit 212 of FIG. 2 and FIG. 3 as to whether the update version is up to date at 610. If, at 610, the determination is that the update version is up to date, then all timers and counters are reset at 612 and the process loops to 602. If, at 610, the determination is that the update version is not up to date, then a second counter is incremented, a second timer is commenced, the first timer is stopped and the first counter reset at 616. Thereafter, an up to date version of the update(s) is installed at 614. If the update has not installed before the second timer expires, at 618, then the process loops to 608. If the update has installed before the second timer expires, at 618, then an optional reboot may be performed at 620. The process then loops to 608.

Figure 7:
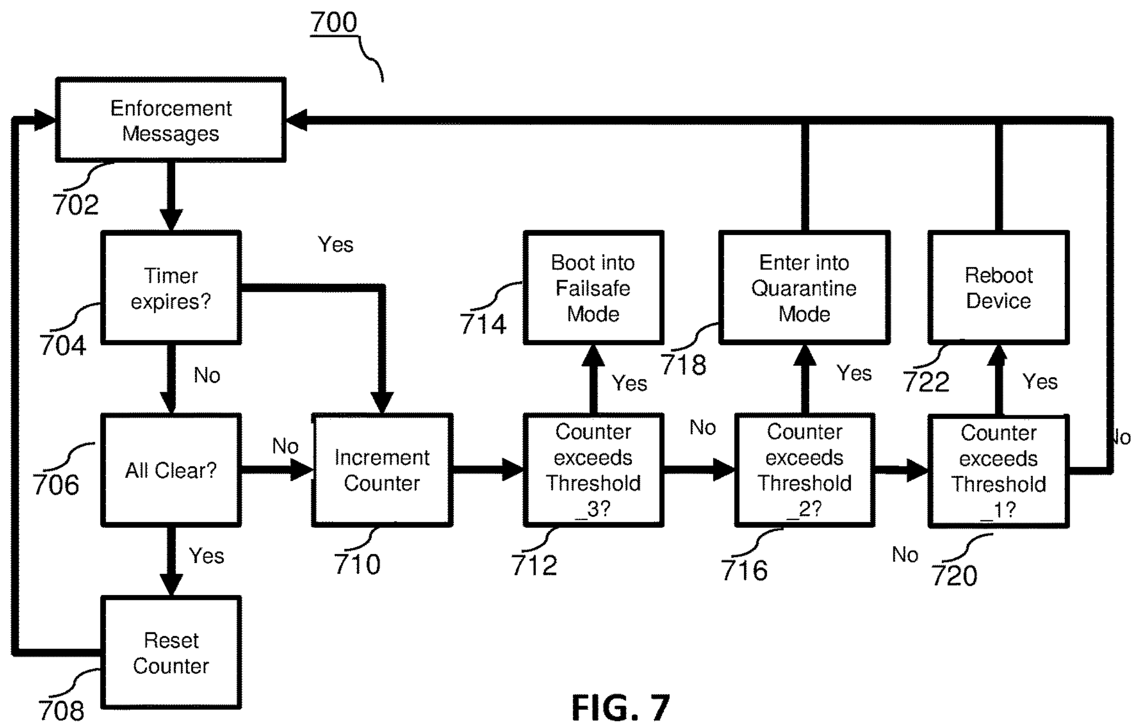
FIG. 7 illustrates an example flow chart for an action flow following a detection of a compromising attack, according to example embodiments of the invention.

Referring now to FIG. 7, an example flow chart 700 for an action flow following a detection of a compromising attack, according to some example embodiments of the invention is illustrated. In the example flow chart 700, enforcement messages are sent at 702 from, say, security monitoring and control circuit 212 of FIG. 2 and FIG. 3 and one or more timers and one or more counters are commenced. A determination is made at 704 as to whether one or more timers have expired. If the timers at 704 have expired, then one or more of the counters is/are incremented at 710. If the timers at 704 have not expired, then a determination is made at 706 as to whether the device state is synchronised to the state on the server and there are no open outstanding actions, e.g., such as installing an update. If the device and server are synchronised at 706, then the one or more counters are reset at 708 and the process loops to 702. However, if all is not clear at 706, then one or more of the counters is/are incremented at 710.

Following an incrementing of the one or more counters at 710, a determination is made as to whether one or more counters exceed(s) a third threshold level at 712. If at 712, the one or more counters exceeds the third threshold level, the security monitoring and control circuit 212 of FIG. 2 and FIG. 3 performs a re-boot of the device into a failsafe mode at 714. If at 712, the one or more counters do(es) not exceed the third threshold level, a determination is made as to whether one or more counters exceeds a second threshold level at 716. If at 716, the one or more counters exceeds the second threshold level, the security monitoring and control circuit 212 of FIG. 2 and FIG. 3 performs an action that places the device into a quarantine mode of operation at 718. If at 716, the one or more counters does not exceed the second threshold level, a determination is made as to whether one or more counters exceeds a first threshold level at 720. If at 720, the one or more counters exceeds the first threshold level, the security monitoring and control circuit 212 of FIG. 2 and FIG. 3 performs a device reboot operation at 722. If at 720, the one or more counters do(es) not exceed the first threshold level, the process loops to 702.

In contrast to the teaching in U.S. Pat. No. 8,909,930B2, where it is stated that the challenges are to be performed by a "secure application" on an "untrusted device", the examples herein described address a scenario whereby there is neither a requirement for a "secure" application nor a requirement about the security/trustworthiness of any device or component, such as the REE.

There is no contemplation in the teaching of U.S. Pat. No. 8,909,930B2 for restoring or improving the security status of the untrusted device. Instead, an assessment of the current status is made based on the response to the challenges. This assessment is limited to a pure binary decision, in that a correct response means that the untrusted device is secure, and an incorrect response means that the untrusted device is unsecure. Therefore, in further contrast to the teaching in U.S. Pat. No. 8,909,930B2, the examples herein described provide mechanisms to restore/improve the security status of the untrusted device. Furthermore, the claimed invention differs from the teaching of U.S. Pat. No. 8,909,930B2 by assigning an untrusted status to the REE. Additionally, the examples herein described assess the behaviour of the untrusted device in a more flexible and intelligent manner, in that the security monitoring and control circuit 212 of FIG. 2 and FIG. 3 would allow an incorrect response, so long as there is at least one correct response received within a certain time frame. This flexibility facilitates configuring of various device recovery actions according to the level of compromisation.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A device comprises:

at least one host application;

a rich execution environment (REE);

at least one interface operably coupled to the REE for communicating with a remote server;

wherein the device is characterised in that:

a security sub-system comprises a security monitoring and control circuit coupled to the REE and connectable to the remote server via the REE and the at least one interface, wherein the security monitoring and control circuit comprises an analytics circuit configured to detect an anomaly following a compromisation of the device, and the security monitoring and control circuit is arranged to treat the REE as an untrusted component and in response to a detection of a compromisation of the REE or a component in the device that is accessible by the REE by the analytics circuit, the security monitoring and control circuit is configured to initiate re-establishing a secure connection to the remote server that tunnels through the REE and at least partially removes the compromisation from the device.

2. The device of claim 1 wherein the analytics circuit is configured to monitor the device's activity and detects an anomaly following a compromisation of the device, by identifying a change in the data or behavior of the device's activity.

3. The device of claim 2 wherein the analytics circuit is configured to detect an anomaly following a compromisation of the device, by comparing the monitored data or behavior of the device's activity with a trained or pre-determined model of normal data.

4. The device of claim 1 wherein the security monitoring and control circuit is configured to employ the re-established secure connection to the remote server for deployment of at least one of: at least one update, or at least one execution of a remote command received from the remote server on the device.

5. The device of claim 4 wherein the security monitoring and control circuit, subsequent to detecting a compromisation, is configured to perform periodic checks for the at least one update to be applied to at least one component or circuit within the device, and obtain said at least one update from a monitoring and analytics service circuit within or coupled to the remote server.

6. The device of claim 1 wherein the security monitoring and control circuit comprises at least one of: at least one timer comprising at least one timer threshold, at least one counter comprising at least one counter threshold, and detection of a compromisation of the REE is identified following a detection of anomalous behaviour of one or more untrusted component(s) of the device that exceeds the at least one timer threshold or the at least one counter threshold.

7. The device of claim 1 wherein, in response to a detection of a compromisation of the REE, the security monitoring and control circuit performs an action to place the device into a trusted operational state.

8. The device of claim 7 wherein, the security monitoring and control circuit performs an action to place the device into a trusted operational state by performing one of the following:
- rebooting at least a part of the device;
- running a self-check routine of the device's circuits and components;
- limiting one or more capabilities of the device whilst maintaining some functionality;
- forcing the device to boot a trusted image that enables device maintenance;
- communicating with the remote server; and
- allowing the device to receive a secure update or command from the remote server.

9. The device of claim 7 wherein, the security monitoring and control circuit performs an action to place the device into a trusted operational state based on at least one user-configurable attribute or user-configurable parameter in the security monitoring and control circuit.

10. The device of claim 1 wherein the security monitoring and control circuit is implemented as one of the following:
- separate hardware or firmware part of the device, physically isolated from the REE;
- configured to run as part of a hypervisor that runs on hardware coupled to the REE;
- configured to run in a trusted virtual machine on a hypervisor; and/or
- configured to run in a secure system and isolated from the REE by an application.

11. An integrated circuit for a device, the integrated circuit comprising:
- at least one host application;
- a rich execution environment (REE) for communicating with a remote server; and
- a security sub-system that comprises a security monitoring and control circuit coupled to the REE and connectable to the remote server via the REE and an interface;
- wherein the integrated circuit is characterised in that the security monitoring and control circuit comprises an analytics circuit configured to detect an anomaly following a compromisation of the device, and the security monitoring and control circuit is arranged to treat the REE as an untrusted component of the device and in response to a detection of a compromisation of the REE or a component in the device that is accessible by the REE by the analytics circuit, the security monitoring and control circuit is configured to initiate re-establishing a secure connection to the remote server via the interface that tunnels through the REE and at least partially removes the compromisation from the device.

12. A method for a security device, the method comprising:
- communicating with a remote server by and via a rich execution environment (REE);
- wherein the method is characterised by:
- treating the REE as an untrusted component by a security monitoring and control circuit coupled to the REE;
- detecting a compromisation of the REE or a component in the device that is accessible by the REE, and
- in response to a detection of a compromisation of the REE,
- initiating, by the security monitoring and control circuit, re-establishing a secure connection to the remote server from the security monitoring and control circuit that tunnels through the REE and
- removing at least partially the compromisation from the device.

13. The method for a security device of claim 12 further comprising:
- monitoring the device's activity and
- detecting an anomaly following a compromisation of the device by identifying a change in the data or behaviour of the device's activity.

14. The method for a security device of claim 13 wherein detecting an anomaly following a compromisation of the device comprises comparing the monitored data or behaviour of the device's activity with a trained or pre-determined model of normal data.

15. The method for a security device of claim 12 further comprising employing the re-established secure connection to the remote server for deployment of at least one of: at least one update, or at least one execution of a remote command received from the remote server on the device.

* * * * *